(12) United States Patent
Diaz et al.

(10) Patent No.: US 6,303,051 B1
(45) Date of Patent: Oct. 16, 2001

(54) PHOSPHATE TREATED SILICATE PHOSPHOR

(75) Inventors: Anthony L. Diaz, Athens; Charles F. Chenot, Towanda, both of PA (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 09/392,891

(22) Filed: Sep. 9, 1999

(51) Int. Cl.$^7$ ............................. C04K 11/02; C04K 11/59
(52) U.S. Cl. ......................... 252/301.4 F; 252/301.4 P; 252/301.6 F; 252/301.6 P
(58) Field of Search ..................... 428/403; 427/215; 252/301.4 F, 301.4 P, 301.6 R, 301.6 P

(56) References Cited

FOREIGN PATENT DOCUMENTS

3634886 * 4/1988 (DE) .

OTHER PUBLICATIONS

Derwent Abstract 1973–04364U, abstract for CA 950956, pub. Jul. 9, 1974.*

* cited by examiner

*Primary Examiner*—C. Melissa Koslow
(74) *Attorney, Agent, or Firm*—Robert F. Clark

(57) ABSTRACT

A novel phosphate treated silicate phosphor has been invented that exhibits improved lumen maintenance with respect to the untreated phosphor when used in a fluorescent lamp. In one aspect, a protective phosphate-containing surface layer is formed by treating the phosphor in an aqueous phosphate solution, filtering, and annealing. In particular, a $BaSi_2O_5$:Pb phosphor that has been treated in this way exhibits improved maintenance in a fluorescent lamp and a characteristic X-ray diffraction pattern evidencing the presence of the protective phosphate-containing surface layer.

12 Claims, 2 Drawing Sheets

PHOSPHATE TREATED SILICATE PHOSPHOR

TECHNICAL FIELD

This invention relates to silicate-based phosphors, and especially to lead activated barium disilicate ($BaSi_2O_5$:Pb), used in fluorescent lighting applications. More particularly, it relates to improved maintenance of silicate phosphors in fluorescent lamps.

BACKGROUND OF THE INVENTION

Typical silicate phosphors used in fluorescent lighting applications include $BaSi_2O_5$:Pb, $Zn_2SiO_4$:Mn and $CaSiO_3$:Pb,Mn. Of particular interest is $BaSi_2O_5$:Pb which is used as the long-wavelength UV (347 nm) phosphor in fluorescent suntanning lamps. Its preparation and use have been described in U.S. Pat. Nos. 2,597,631, 3,043,781, and 5,234,625 which are incorporated herein by reference. A well-known drawback to the use of this phosphor, and silicate phosphors in general, is that lumen maintenance in fluorescent lamps is poor relative to other fluorescent lamp phosphors. That is, fluorescent lamps employing silicate phosphors exhibit a relatively rapid decrease in brightness over time.

It has been demonstrated, however, that the life of silicate phosphors can be extended considerably by applying a protective coating to the phosphor particles. In particular, U.S. Pat. Nos. 5,223,341 and 4,710,674 describe an $A_2O_3$ coating which improves the maintenance of silicate phosphors in fluorescent lamps. The protective alumina coating is applied via a CVD method in a fluidized bed using pyrophoric organometallic compounds. While effective, the prior art method requires relatively complex coating equipment and hazardous chemicals. Thus, it would be advantageous to have a simpler, more economical method for protecting silicate phosphors and improving their maintenance in fluorescent lamps.

SUMMARY OF THE INVENTION

It is an object of the invention to obviate the disadvantages of the prior art.

It is another object of the invention to provide a silicate phosphor having improved lumen maintenance in fluorescent lamps.

It is a further object of the invention to provide a method of treating silicate phosphors to improve their lumen maintenance in fluorescent lamps.

In accordance with one aspect the invention, there is provided a phosphate treated silicate phosphor having a protective phosphate-containing surface layer.

In accordance with another aspect of the invention, there is provided a method for treating a silicate phosphor comprising mixing the phosphor in an aqueous phosphate solution for a time sufficient to induce the formation of phosphate-containing surface layer, separating the phosphor from the solution, and annealing the phosphor to form a protective phosphate-containing surface layer.

DESCRIPTION OF THE PREFERRED EMBODIMENTS

Figure 1:
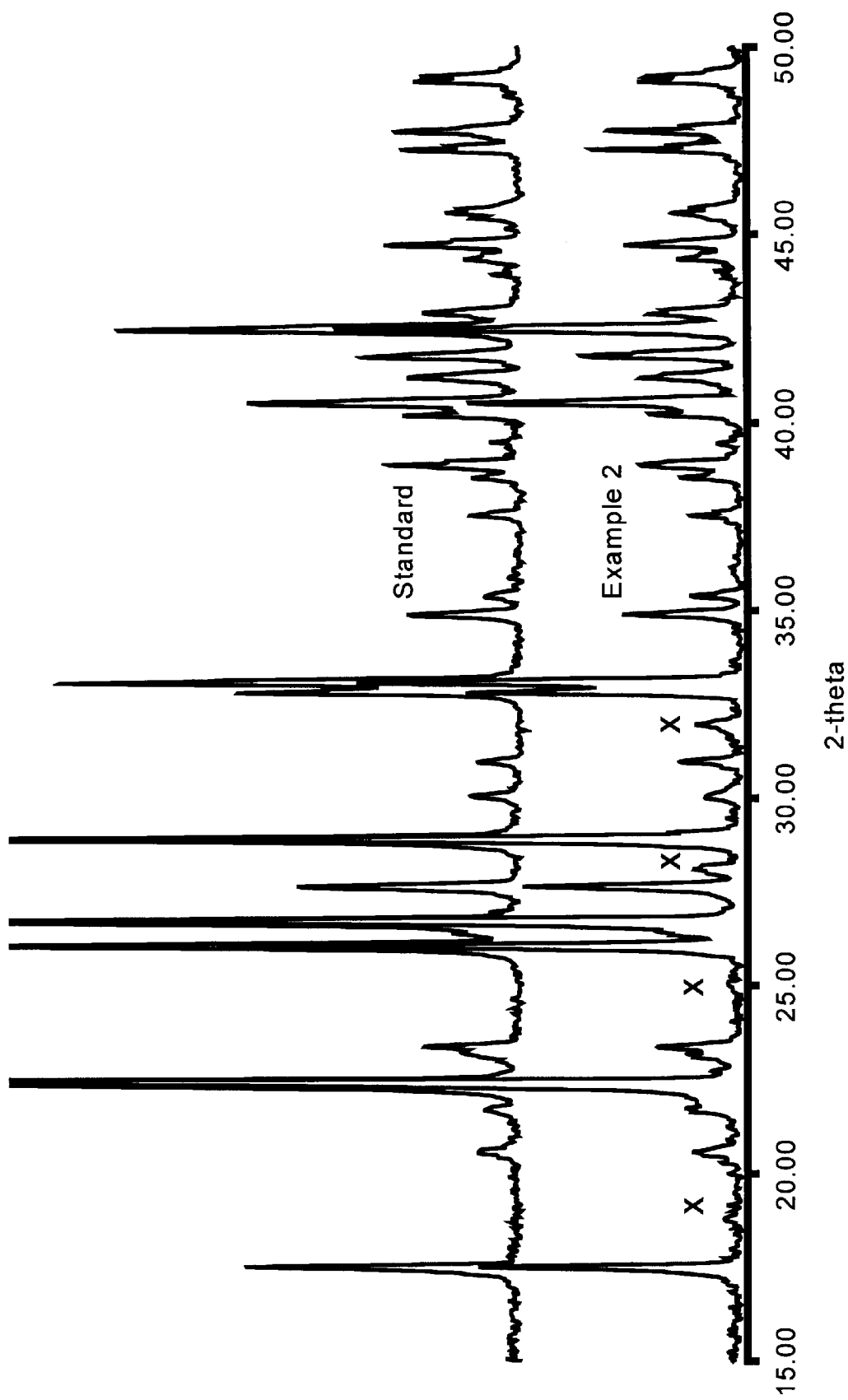
FIG. 1 is a comparison of the X-ray diffraction patterns of a phosphate treated silicate phosphor of this invention and an untreated standard.

For a better understanding of the present invention, together with other and further objects, advantages and capabilities thereof, reference is made to the following disclosure and appended claims taken in conjunction with the above-described drawings.

The present invention is a silicate phosphor having a protective phosphate-containing surface layer. The phosphate-containing layer may be formed on solid-state silicate phosphors that have been previously prepared by any synthetic technique. Silicate phosphors treated in this way exhibit improved retention of their initial lumen output during operation of a lamp. The protective phosphate-containing surface layer refers to a region at the surface of the silicate phosphor particles which contains an amount of a phosphate. As used herein, the term phosphate means any group of bound oxygen and phosphorus atoms, including but not limited to, phosphate, $PO^{-3}_4$, and pyrophosphate, $P_2O_7^{-4}$, either alone or in combination with other elements such as hydrogen.

In one embodiment, the protective surface layer is applied by treating the phosphor directly with an aqueous phosphate solution, dried, and annealed to create a phosphor particle which is covered with a phosphate-containing layer. In another embodiment, the phosphate-containing layer is formed by first leaching the phosphor particle surface of cations ($Ba^{2+}$, $Pb^{2+}$) with an acid solution, e.g. citric acid, in order to create a reactive silica shell on the particle surface. The leached surface is then treated with the aqueous phosphate solution, dried and annealed. In a third embodiment, the layer can be formed by dry blending a phosphate source with a silicate phosphor and annealing. In the last instance, smaller amounts of phosphate are preferred.

In a preferred embodiment, the protective phosphate-containing layer is applied to the surface of a $BaSi_2O_5$:Pb phosphor which has been previously prepared by conventional solid state synthetic methods and which exhibits luminescence characteristics suitable for application in suntanning lamps. The phosphor may or may not be acid washed prior to the treatment. The phosphate-containing layer is formed by mixing the phosphor in an aqueous phosphate solution containing from about 2 to about 5 moles/liter phosphorus in a ratio of about 1:1 to about 6:1 moles of phosphorus to moles of phosphor. Preferably, the phosphate solution is a solution of diammonium phosphate (DAP). However, other phosphate salts, such as sodium tripolyphosphate ($Na_5P_3O_{10}$), or organo-phosphate compounds like triethyl phosphate, could also reasonably be used within the context of the present invention. Mixing can be carried out at any reasonable solution temperature for times of 30 minutes or more. Following mixing, the solution is filtered and the treated phosphor dried and annealed at temperatures from about 800° C. to about 1100° C. for about 2 hours to about 8 hours. The treated phosphor, after washing with water and drying, is ready for use in a fluorescent lamp.

The following non-limiting examples are presented. In each of the examples, the phosphor was a $BaSi_2O_5$:Pb phosphor made by OSRAM SYVANIA Products, Inc., Towanda, Pa. (Type 2011C).

EXAMPLE 1

Four hundred grams of $BaSi_2O_5$:Pb phosphor and 600 g of diammonium phosphate were mixed with 4.0 liters of deionized water for 2 hours at room temperature. The treated phosphor was removed by filtering and dried overnight at 130° C. Following drying, the treated phosphor was annealed in open silica crucibles at 1050° C. for four hours. The resulting fired cakes were washed with water and dried. The phosphor was then incorporated into standard 1.5 inch diameter, 20 watt (F20T12) fluorescent lamps for testing.

EXAMPLE 2

The phosphor in this example was treated as in Example 1, except that the annealing was done for 7 hours at 1050° C.

EXAMPLE 3

Four hundred grams of $BaSi_2O_5$:Pb phosphor and 4.0 g of citric acid were added to 4.0 liters of deionized water and mixed for 1 hour. Following the acid wash, the leached phosphor was filtered and dried. The leached phosphor was then phosphate treated as in Example 1.

The surface compositions of the phosphate treated phosphors are compared to that of the untreated phosphor in Table 1. The surface compositions were measured using ESCA (Electron Spectroscopy for Chemical Analysis) which probes the outermost 10 to 30 angstroms of the surface. The presence of the phosphate-containing surface layer on the treated phosphors is evidenced by the presence of 2.7–3.2 percent atomic phosphorus and the reduction in the surface concentrations of barium and silicon.

TABLE 1

| Sample | Surface Composition (% atomic) | | | |
|---|---|---|---|---|
| | Ba | Si | Pb | P |
| Example 1 | 4.8 | 23 | 0.2 | 2.8 |
| Example 2 | 5.0 | 22 | 0.2 | 2.7 |
| Example 3 | 4.5 | 20 | 0.2 | 3.2 |
| Untreated standard | 6.5 | 24 | 0.3 | 0.2 |

The performances of these phosphors in fluorescent lamps are compared in Table 2. Maintenance (% M) is defined as the 100 hour lumen output divided by the lumen output at 0 hours of operation. The phosphors treated in accordance with the present invention exhibit a modest improvement in the lumen output after 100 hours of operation and a significant improvement in lumen maintenance. In particular, lumen maintenance was improved by at least about 4% over the untreated standard.

TABLE 2

| Sample | 0 hr. (lumens) | 100 hr. (lumens) | % M |
|---|---|---|---|
| Example 1 | 15873 | 13985 | 88.1 |
| Example 2 | 16132 | 14077 | 87.3 |
| Example 3 | 16698 | 14161 | 84.8 |
| Untreated standard | 17109 | 13918 | 81.3 |

Further evidence for the formation of a protective phosphate-containing surface layer is provided by X-ray diffraction and Raman spectroscopy. The X-ray diffraction patterns for a treated phosphor (Example 2) and the untreated standard are compared in FIG. 1. The untreated standard exhibits reflections for $BaSi_2O_5$, as well as for some excess $SiO_2$. The treated phosphor exhibits additional 2 θ angle reflections at 18.8°, 25.0°, 28.2° and 32.0° which are shown marked with an "x". These additional reflections most closely match those of $Ba_3(PO_4)_2$.

Figure 2:
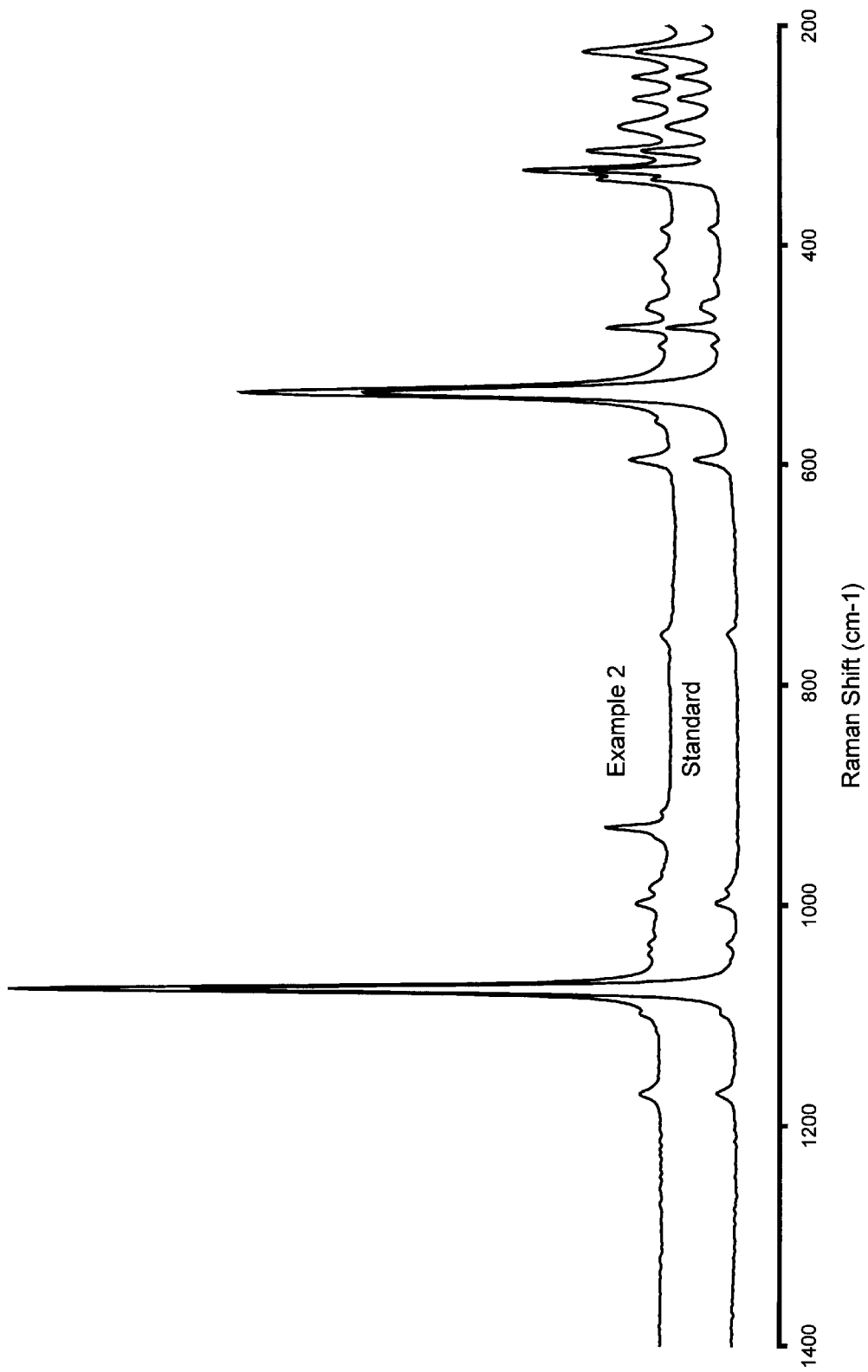
FIG. 2 is a comparison of the Raman spectra of a phosphate treated silicate phosphor of this invention and an untreated standard.

Raman spectra of the treated phosphor and untreated standard are compared in FIG. 2. The Raman spectrum of the untreated standard material is characterized by two intense peaks at about 540 and 1075 $cm^{-1}$. The treated material contains additional peaks at 410, 560, 930 and 1020 $cm^{-1}$. The peaks at 930 and 1020 $cm^{-1}$ have been associated with ($PO_4^{3-}$) and ($P_2O_7^{4-}$) groups in phosphorus doped silicate glasses (e.g., B. Mysen, *American Mineralogist* 81, pp. 1531–1534, (1996)).

While there has been shown and described what are at the present considered the preferred embodiments of the invention, it will be obvious to those skilled in the art that various changes and modifications may be made therein without departing from the scope of the invention as defined by the appended claims. In particular, it is anticipated that the present invention can be applied to other silicate phosphors and more particularly to $Zn_2SiO_4$:Mn or $CaSiO_3$:Pb, Mn phosphors.

We claim:

1. A phosphate treated silicate phosphor having a protective phosphate-containing surface layer and a Raman spectrum having peaks at 930 and 1020 $cm^{-1}$.

2. The phosphor of claim 1 wherein the phosphor is selected from the group consisting of $BaSi_2O_5$:Pb, $Zn_2SiO_4$:Mn and $CaSiO_3$:Pb,Mn.

3. A phosphate treated $BaSi_2O_5$:Pb phosphor having a protective phosphate-containing surface layer and an x-ray diffraction pattern having 2θ angle reflections at 18.8°, 25.0°, 28.2° and 32.0°.

4. The phosphor of claim 3 wherein lumen maintenance of the phosphor in a fluorescent lamp is increased by at least about 4% as compared to the same phosphor without the phosphate treatment.

5. A method for treating a silicate phosphor comprising leaching the phosphor surface with an acid solution, mixing the phosphor in an aqueous phosphate solution for a time sufficient to induce the formation of phosphate-containing surface layer, separating the phosphor from the solution, and annealing the phosphor to form a protective phosphate-containing surface layer.

6. The method of claim 5 wherein the acid solution contains citric acid.

7. The method of claim 6 wherein the phosphor is $BaSi_2O_5$:Pb.

8. The method of claim 5 wherein the phosphor is annealed at a temperature from about 800° C. to about 1100° C. for about 2 hours to about 8 hours.

9. The method of claim 5 wherein the aqueous phosphate solution contains a phosphate selected from the group consisting of diammonium phosphate, sodium tripolyphosphate and triethyl phosphate.

10. The method of claim 9 wherein the aqueous phosphate solution contains diammonium phosphate.

11. The method of claim 10 wherein the phosphor is $BaSi_2O_5$:Pb.

12. The method of claim 5 wherein the phosphor is selected from the group consisting of $BaSi_2O_5$:Pb, $Zn_2SiO_4$:Mn and $CaSiO_3$:Pb,Mn.

* * * * *